Feb. 26, 1929.
S. G. SLAUTER ET AL
1,703,554
FISHING POLE HOLDER
Filed March 15, 1927
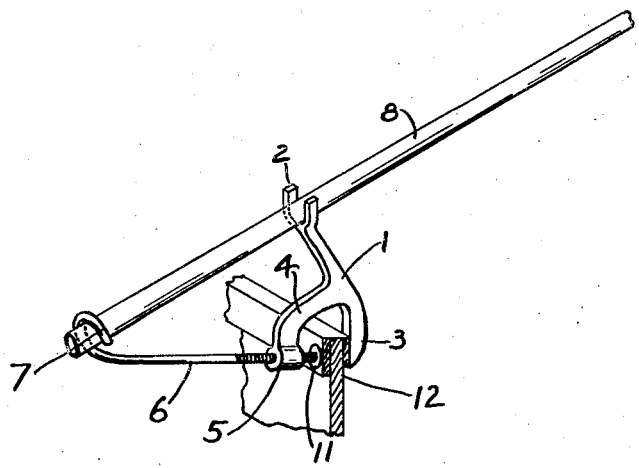
FIG. 1
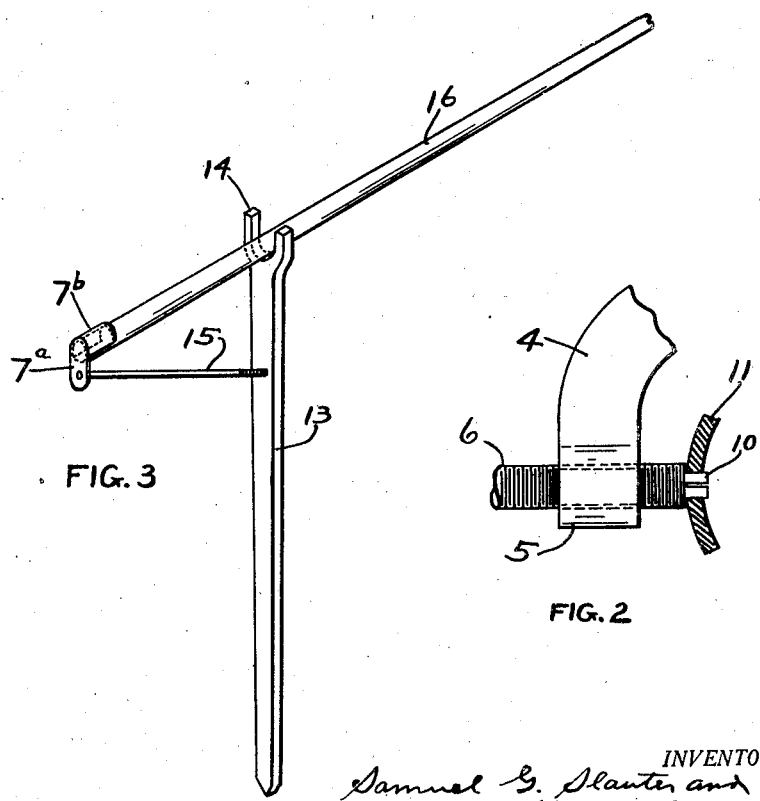
FIG. 3
FIG. 2
INVENTORS,
Samuel G. Slauter and
BY Harry H. Copeland,
Howard P. Smith
His ATTORNEYS.

Patented Feb. 26, 1929.

1,703,554

UNITED STATES PATENT OFFICE.

SAMUEL G. SLAUTER AND HARRY N. COPELAND, OF DAYTON, OHIO.

FISHING-POLE HOLDER.

Application filed March 15, 1927. Serial No. 175,558.

This invention relates to new and useful improvements in fishing pole holders.

It is one of the principal objects of our invention to provide a simple and cheaply constructed holder for easy attachment to a boat or other support to hold a pole in a stationary position for fishing. The holder is made in two easily assembled parts so that it may be conveniently carried in a small space, and though primarily adapted for holding fishing poles, it is also eminently fitted to support flag and other poles.

In the accompanying drawings illustrating our invention, Figure 1 is a perspective view of our holder clamped to the side of a boat for supporting a fishing pole. Figure 2 is an enlarged side-view of the threaded end of the clamping rod when within the boss on one end of the bifurcated members. And Figure 3 is a perspective view of our improved holder in a form for support by the ground.

Referring to the accompanying drawings for a detailed description of our invention, the numeral 1 in Figure 1 designates a holder that is preferably a casting comprising an inclined supporting arm having a bifurcated upper end 2 and terminating at its lower end in a vertical finger portion 3 and an inclined finger portion 4. Formed on the outer end of the latter opposite the lower end of the finger portion 3, is a horizontal boss 5 containing a threaded axial hole to receive the threaded end of a clamping rod 6.

The rod 6 terminates at its rear end in a hook portion 7 to receive the rear end of a pole 8 which is adapted to rest upon the bifurcated end 2 of the casing 1. (See Figure 1.) The hook end 7 of the rod 6 holds the rear end of the pole down against the pull of the greater weight of its front end beyond the fulcrum 2. Any other suitable means that may be attached to the rod 6 for receiving the rear end of the pole, may be employed if desired.

Applied by a screw 10 or other removable means to the inner threaded end of the rod 6 is a washer 11 for engagement with a support, such as a boat side 12.

Our improved pole holder is easily assembled by screwing the threaded end of the rod 6 through the boss 5 on the arm 4 of the casting 1, after which the washer 11 is applied to the inner end of said rod. The casting 1 is then placed in the position shown in Figure 1, wherein it will straddle the top edge part of the boat side 12. The rod 6 is then turned by its hook end 7 in a direction to cause its threaded engagement with the boss 5 to force the washer 11 against the boat side until the latter is firmly gripped between said rod and the finger portion 3 of the casting. A fishing pole is then placed on the bifurcated part 2 of the supporting member 1, with its rear end under the hook portion 7 of the rod 6. (See Figure 1.)

The simplicity of our pole holder is now apparent, since the rod 6 not only anchors the rear end of the pole but also acts as the thrust member for co-operation with the finger 3 in clamping the holder to the boat. The small number of parts of which it is made enables the holder to be economically manufactured for sale at a low price.

In Figure 3 we have shown a stake member 13 adapted to be driven into the ground. This member is formed with a bifurcated upper end 14 and with a threaded hole below it to receive the threaded end of a rod 15. This rod 15 carries on its outer end a back rest 7$^a$ and a shield 7$^b$ to hold down the rear end of a pole 16 placed on the bifurcated end 14 of the stake 13.

We do not desire to be limited to the details of construction and arrangement herein shown and described, and any change or modifications may be made therein within the scope of the subjoined claims.

Having described our invention, we claim:

1. A pole holder comprising a member having a pole receiving upper end and a downwardly projecting bifurcated lower end to straddle a vertical support, and a horizontal rod for holding down at its outer end the rear end of the pole and having a screw threaded engagement at its inner end with one part of the bifurcated lower end of the holder member, said inner end adapted to engage said support opposite its engagement by the other part of the bifurcated lower end of the holder member to firmly clamp the latter to said support.

2. A pole holder comprising a member having a pole receiving upper end and a downwardly projecting bifurcated lower end to straddle a vertical support, one part of the bifurcated lower end of said member being formed with a boss containing a threaded axial hole, a horizontal rod having a screw-threaded inner end for passage through said hole, said end adapted to engage the support opposite its engagement by the other part of the bifurcated lower end of the holder member, to firmly clamp it to said support, and a receiving part on the other end of said rod for the pole.

In testimony whereof we have hereunto set our hands this 12th day of March, 1927.

SAMUEL G. SLAUTER.
HARRY N. COPELAND.